United States Patent
Kappelmüller

(10) Patent No.: US 6,575,732 B2
(45) Date of Patent: Jun. 10, 2003

(54) INJECTION MOLDING MACHINE

(75) Inventor: Werner Kappelmüller, Schwertberg (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 72 days.

(21) Appl. No.: 09/866,268

(22) Filed: May 25, 2001

(65) Prior Publication Data

US 2001/0053396 A1 Dec. 20, 2001

(30) Foreign Application Priority Data

Jun. 7, 2000 (AT) .......................................... 421/2000 U

(51) Int. Cl.[7] ............................................. B29C 45/64
(52) U.S. Cl. ..................... 425/595; 100/231; 100/258 A
(58) Field of Search .............................. 425/595, 451.9; 100/231, 258 A

(56) References Cited

U.S. PATENT DOCUMENTS

| | | |
|---|---|---|
| 5,633,024 A | 5/1997 | Amir |
| 5,650,182 A * | 7/1997 | Fuller et al. ................ 425/595 |
| 5,762,984 A * | 6/1998 | Wimbauer ................... 425/595 |
| 6,068,463 A * | 5/2000 | Urbanek ...................... 425/595 |
| 6,186,771 B1 * | 2/2001 | Damkjær ...................... 425/595 |

FOREIGN PATENT DOCUMENTS

| | | |
|---|---|---|
| AT | 402711 | 6/1995 |
| DE | 4420639 | 6/1994 |
| DE | 19732337 | 7/1997 |
| EP | 0311133 | 10/1988 |
| EP | 0789648 | 4/1998 |
| WO | 9707961 | 3/1997 |

* cited by examiner

Primary Examiner—James P. Mackey
(74) Attorney, Agent, or Firm—Notaro & Michalos P.C.

(57) ABSTRACT

An injection molding machine comprising a substantially C-shaped machine frame, on the one limb (9) of which is mounted a stationary mold mounting plate (2) and on the other limb of which is mounted a closing mechanism for driving a movable mold mounting plate, wherein the free ends of the limbs of the machine frame, which ends are not connected by beam members, deform under the influence of the closing force which occurs during the closing operation, and wherein at least one of the mold mounting plates (2) and/or an end plate carrying the closing mechanism are respectively supported against the closing force at their upper and lower edges, and the lower support of the mold mounting plate(s) (2) or the end plate (3) respectively is formed by a bending pin (10) which extends transversely with respect to the longitudinal direction of the machine.

5 Claims, 3 Drawing Sheets

INJECTION MOLDING MACHINE

Figure 1:
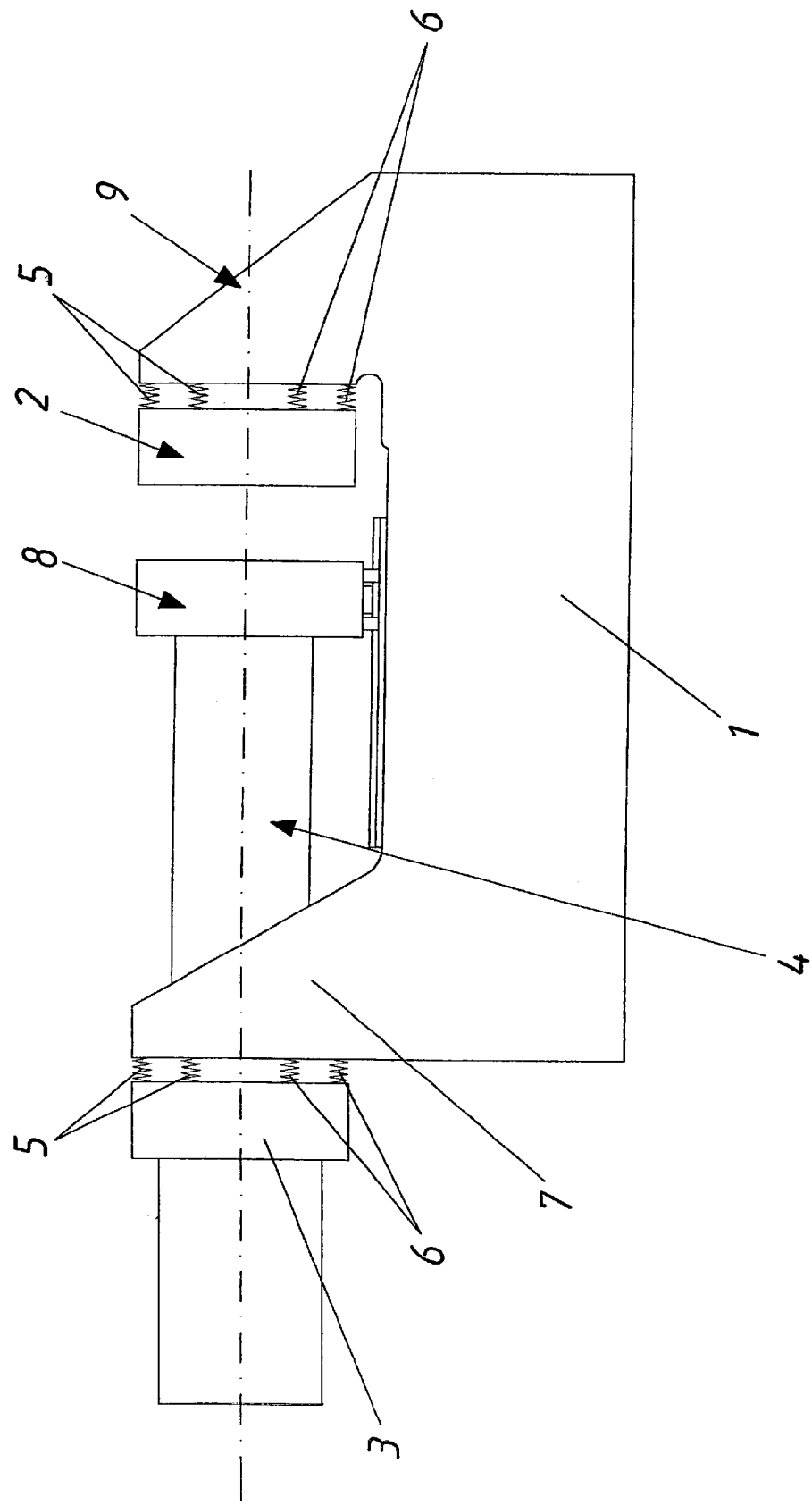

The invention relates to an injection molding machine comprising a substantially C-shaped machine frame, on the one limb of which is mounted a stationary mold mounting plate and on the other limb of which is mounted a closing mechanism for driving a movable mold mounting plate, wherein the free ends of the limbs of the machine frame, which ends are not connected by beam members, deform under the influence of the closing force which occurs during the closing operation, and wherein at least one of the mold mounting plates and/or an end plate carrying the closing mechanism are respectively supported against the closing force at their upper and lower edges.

In arrangements of that kind, the purpose of the upper support for the plates is to permit pivotal movement of the plate with respect to the machine frame when the associated limb of the frame pivots outwardly. In that case the upper support can be in the form of a conventional pivot provided with bearing trunnions (see DE 44 20 639 C1), in the form of rolling bearings (see WO 97/07961) or in the form of a deformable holding element (see EP 0 789 648 B1). If, when the limbs of the frame spread open, the ends of the limb are turned inwardly by virtue of the suitable arrangement of a slot in the limb of the frame, the plates can also be rigidly connected to the frame and nonetheless retain their vertical position if the frame deforms under the closing force.

So that the mold mounting plates in the described apparatuses can remain in their vertical position and thus parallel to each other in spite of expansion of the C-frame due to the closing force, it is necessary for the lower edge of the plates to be displaced by a precisely defined distance. In the case of machines with two pivotably arranged plates the displacement of the lower edge must precisely correspond to that of the upper edge. In the case of machines with a single, centrally arranged pivot, as are described in EP 0 311 133, the pivotal movement of the lower edge of the movable mold mounting plate must correspond to the pivotal movement of the mold mounting plate which is fixedly connected to the associated limb of the frame. In order to resolve that problem, DE 44 20 639 C1 proposes the use of two pivotably mounted pressure bars which extend in the longitudinal direction of the machine. For example WO 97/07961 discloses the connection of the pivotable plates by means of lower tie beam members. the longitudinal direction of the machine. For example WO 97/07961 discloses the connection of the pivotable plates by means of lower tie beam members.

Deflection of the limbs of the frame of the machine in the region of the upper pivotal mounting of the plates is to be attributed on the one hand to the pivotal movement of the limb generally and on the other hand to bending and warping thereof. That deformation is not to be correspondingly reproduced either by that of tensile or pressure bars or even more by that of pressure pads or cushions.

In accordance with the invention in comparison it has been possible to provide a lower support whose deformation under the closing force, even in relation to closing forces of different magnitudes, respectively corresponds to the desired value. That is achieved in that the lower support of the mold mounting plate(s) or the end plate respectively is formed by a bending pin which extends transversely with respect to the longitudinal direction of the machine.

Figure 2:
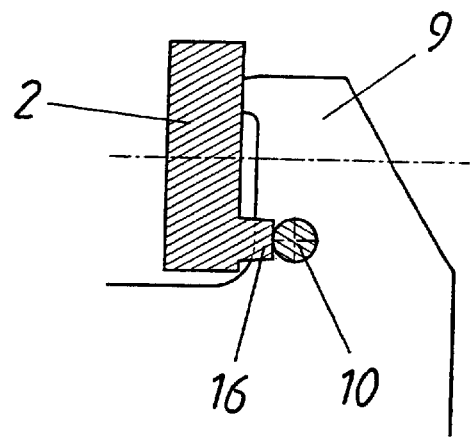
Figure 3:
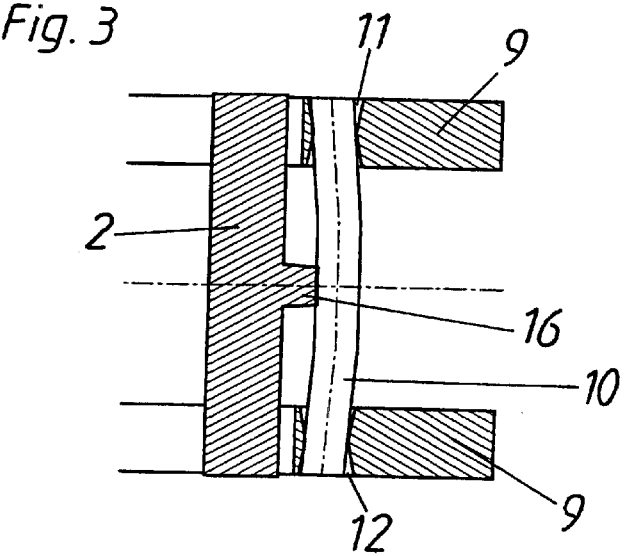
Figure 4:
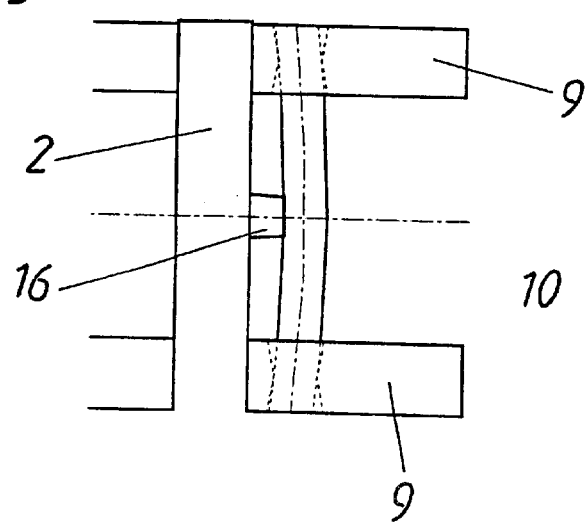
Figure 5:
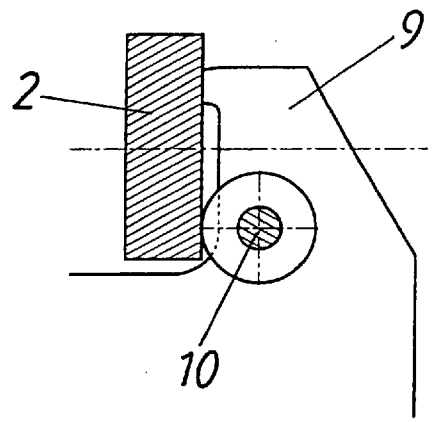
Figure 6:
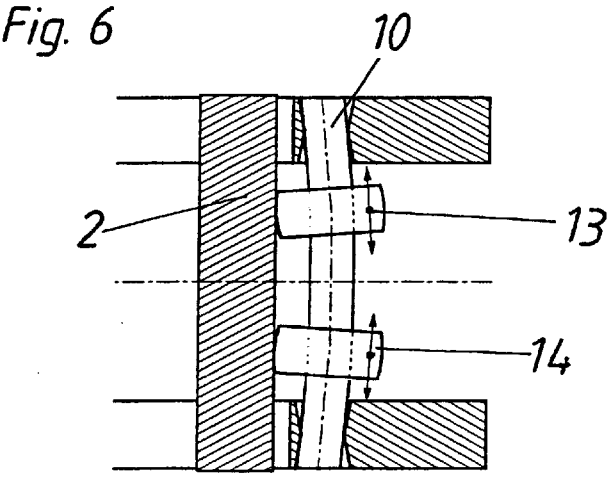
Figure 7:
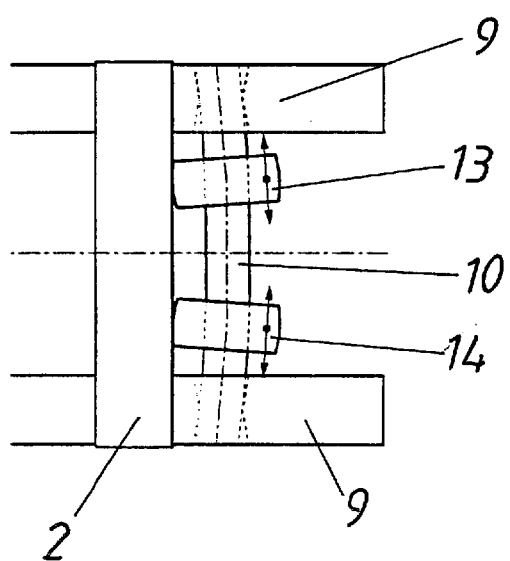

Further details of the invention are described hereinafter with reference to the drawing in which:

FIG. 1 is a diagrammatic view of an apparatus in accordance with the state of the art, FIGS. 2 to 4 are a view on an enlarged scale of the fixing region of the fixed mold mounting plate in vertical section, in horizontal section and as a plan view, and FIGS. 5 to 7 correspond to FIGS. 2 to 4 for a further embodiment.

FIG. 1 diagrammatically shows a beam-less injection molding machine in accordance with the state of the art. In this case, a C-shaped machine frame 1 with frame limbs 7 and 9 carries on the one hand a fixed mold mounting plate 2, and on the other hand an end plate 3 which is connected to a hydraulic drive device 4 for the movable mold mounting plate 8. Under the impression of the closing force which the drive device 4 applies to the mold halves (not shown) by way of the mold mounting plates 2 and 8, the frame limbs 7 and 9 flex and at the same time pivot outwardly by the web portion of the frame 1 curving somewhat upwardly in the center. Upper holding elements 5 between the frame limb 9 and the fixed mold mounting plate 2 and between the frame limb 7 and the end plate 3 permit the plates 2 and 3 to be decoupled from the rotational movement of the frame limbs 7 and 9. So that the plates 2 and 3 remain vertical however it is essential that the lower edges of the plates 2 and 3, which lower edges are supported by way of the resilient elements 6, move in parallel relationship with the upper edges. In accordance with the invention that is achieved in that the lower edge of the plate is supported at a bending pin 10 which extends transversely with respect to the longitudinal direction of the machine.

The embodiment shown in FIGS. 2 to 4 concerns a fixed mold mounting plate 2 which at its upper edge is so connected to the frame limb 9 that the latter, under the influence of the closing force, only performs a translatory movement towards the right in FIG. 2. Support for the lower edge of the plate 2 is afforded by way of an extension portion 16 in the middle region of the bending pin 10 which is supported in mounting openings 11 and 12 of the frame limbs 9 which are arranged in pairs.

The mounting openings diverge from the center towards both ends and thereby permit the pivotal movement of the ends of the bending pin 10.

The embodiment of FIGS. 5 to 7 involves substantially similar conditions to the case with the embodiment of FIGS. 2 to 4. In this case however support for the lower edge of the plate 2 is afforded not centrally but by way of two abutments 13 and 14. They are displaceable along the bending pin 10, whereby the flexibility of the arrangement can be adjusted without involving major structural complication and expenditure.

What is claimed is:

1. An injection molding machine comprising a substantially C-shaped machine frame having a pair of limbs, a stationary mold mounting plate mounted on one limb of the machine frame, and a closing mechanism for driving a movable mold mounting plate mounted on the other limb of the machine frame, wherein the free ends of the pair of limbs, which are not connected by beam members, deform under the influence of a closing force which occurs during operation of the closing mechanism, and wherein at least one of the mold mounting plates or an end plate carrying the closing mechanism is, respectively, supported against the closing force at an upper edge and a lower edge of said at least one of the molding mounting plates or the end plate, characterized in that a lower support of the mold mounting plates or the end plate, respectively, is formed by a bending pin which extends transversely with respect to a longitudinal direction of the machine.

2. An injection molding machine according to claim 1, wherein said at least one of the mold mounting plates or the end plate is supported centrally against the bending pin.

3. An injection molding machine according to claim 1, further comprising a pair of abutments for said at least one of the mold mounting plates or the end plate on the bending pin.

4. An injection molding machine according to claim 3, wherein the pair of abutments are arranged adjustably along the bending pin.

5. An injection molding machine according to claim 1, wherein the bending pin is supported in a pair of openings in the frame, each opening having a pair of ends and increasing in diameter from a center of the opening toward each of the pair of ends, thereby permitting pivotal movement of the ends of the bending pin.

\* \* \* \* \*